United States Patent Office 3,515,511
Patented June 2, 1970

3,515,511
FAUJASITE PRODUCTION
William H. Flank, Broomall, Pa., assignor to Air Products and Chemicals, Inc., Philadelphia, Pa., a corporation of Delaware
No Drawing. Filed Aug. 22, 1967, Ser. No. 662,304
Int. Cl. C01b 33/26, 33/28; B01j 11/40
U.S. Cl. 23—112                    2 Claims

ABSTRACT OF THE DISCLOSURE

A catalytic grade of raw kaolin is calcined at a temperature above about 965° C. and below about 1095° C. to provide a reactive kaolin which, upon DTA (i.e., Differential Thermal Analysis) at about 980° C., exhibits an exotherm which is less than 15% of the DTA exotherm of raw kaolin. A composition is prepared consisting of: from about 2 to about 6 parts of such calcined kaolin; from about 2 to about 6 parts of water; and about 1 part of sodium hydroxide equivalent. This composition is promptly transferred to an aging zone in which the heat transfer fluid is maintained at a substantially uniform temperature. Particular attention is directed to the feature of maintaining the composition quiescently in only a single aging zone for from about 14 hours to about 14 days until the desired concentration of sodium faujasite has developed, whereupon the product is withdrawn from the aging zone. The procedure has the advantages of high selectivity for sodium faujasite preparation (i.e., small proportions of other zeolites). Surprisingly, the single stage of quiescent aging provides reproducibility of faujasite formation when the process is conducted by factory technicians, and is accordingly superior to multi-step aging procedures sometimes producing products other than the desired sodium faujasite.

BACKGROUND

The treatment to which kaolin is subjected after mining depends in part upon the contemplated end use. Procedures have been established for the production of a catalytic grade of kaolin. It is not efficient to process deposits of kaolin containing excess amounts of iron, rutile, amorphous aluminus disilicate and/or other impurities. The iron oxide content of a catalytic grade of kaolin should not exceed about 0.5% of the ignited kaolin or about 0.43% of the raw kaolin. An amorphous product having less than about 1% Volatile Matter can be prepared by calcining kaolin at a temperature of from about 550 to about 900° C., and the term metakaolin is applied to such a product. When a catalytic grade of kaolin is calcined at a temperature from 965 to 1095° C. to produce a calcined kaolin having, upon Differential Thermal Analysis at about 980° C., an exotherm less than about 15% of the DTA exotherm of raw kaolin, the product is described as a reactive kaolin. The percentage of DTA exotherm of calcined kaolin is determined by conducting a standard test using standard Differential Thermal Analysis equipment and making a comparison with a curve prepared by the use of a series of blends of overcalcined kaolin and raw kaolin.

The reactive kaolin can be employed in the manufacture of sodium faujasite in a sodium alumino-silicate matrix. The thus prepared material can be comminuted, desirably in several stages, including wet grinding, to prepare a dispersion of the faujasite-containing material in water. This dispersion can be employed in the preparation of particles by any method, for example, by spray drying. The thus prepared particles, if from a manufacturing standpoint they are scheduled for use as cracking catalyst, are treated with an ammonium salt solution to reduce the content of sodium oxide equivalent to less than about 2% by weight of the particles. After calcination, the cracking catalyst particles are characterized by the absence of any ion-exchangeable metallic ions, the small amount of sodium present being resistant to conventional ammonium ion exchange. The effectiveness of the particles for the catalytic cracking of petroleum fractions is superior to that of some amorphous silica-alumina cracking catalysts, and such superiority is believed to be attributable to the presence of the crystalline faujasite component in the cracking catalyst. Such crystallinity is measured by X-ray diffraction. Cracking catalyst particles comprising hydrogen faujasite have tonnage markets, but other end uses for faujasite-containing particles, including use in water-softening, selective adsorption, catalyst carriers, and the like have also been proposed with sufficient clarity that compositions containing from about 5% to about 80% faujasite are deemed inherently to possess utility.

SUMMARY OF THE INVENTION

A product comprising a measurable amount of sodium faujasite in a matrix of sodium aluminosilicate is prepared by the alkaline aging of a reactive kaolin calcined at a temperature above about 965° C. and below about 1095° C.

The alkaline aging step utilizes as the alkaline portion of the composition an aqueous solution in which the alkali is usually sodium hydroxide. A portion of the sodium hydroxide can be replaced by stoichiometrically equivalent amounts of potassium hydroxide, lithium hydroxide, calcium hydroxide, magnesium hydroxide, tetraalkyl ammonium hydroxide or the like, either singly or in sime combination. The total amount of alkali present is described as the sodium hydroxide equivalent.

The reactive kaolin is generally amorphous and has no well defined crystallites of mullite. Upon Differential Thermal Analysis at about 980° C., the exotherm exhibited by the reactive kaolin is less than 15% of the DTA exotherm exhibited by raw kaolin. The properties of the reactive kaolin differ depending upon whether the DTA exotherm is (a) in the range from about 15% to about 3% or (b) in the range from about 3% to about 0.3% or (c) below about 0.3%. The acceptable range of proportions and/or patterns of temperature during the aging period and/or duration of aging period are dependent in part upon the nature of the reactive kaolin and its classification amongst the three above-designated classifications of reactive kaolin.

A reactive kaolin having a DTA exotherm in the range from about 3% to about 15% of the DTA exotherm exhibited by raw kaolin can be converted into a faujasite-containing material throughout a wide range of proportions and throughout a wide variety for the patterns for the temperatures of the aging steps or step. Room temperature aging for ten days can be effective. If each component is preheated to about 100° C. prior to mixing, followed by quiescent aging at about 100° C. for about 30 hours, faujasite is produced from the reactive kaolin characterized by the DTA exotherm in the 3–15% range. Multi-step aging at a plurality of temperatures, instead of a single temperature, is also feasible for such reactive kaolin.

The ranges of conditions as regards number of aging steps, temperature, patterns of time, and proportions are somewhat narrower in preparing faujasite from reactive kaolin having a DTA exotherm in the range from about 0.3 to 3%. Reactive kaolin having a DTA exotherm below about 0.3% and in the range less than 0.3%, such as to about the lower detectable limit of about 0.1% is presently available DTA equipment, may exhibit even narrower limitations as to desirable proportions, aging times, conditions or the like. Material having DTA exotherms in these lower ranges, to be classified as suitably reactive kaolins, must be relatively free of any marked presence, as shown by X-ray diffraction analysis, of well-defined mullite crystallites. For some purposes, a classification between about 0.5% and about 1.5%, that is, 1 ± 0.5%, provides a convenient classification, focusing attention upon the continuum of properties which exists between the 1.5% DTA exotherm material and the over-calcined material containing well-defined crystallites of mullite. Although greater interest can be focused on materials within the 0.5–11% range and particularly on the 0.5 to 1.5% range, the uniqueness of materials in the 0.1–15% range as distinguished from under-calcined or over-calcined materials for purposes of the present process requires significant emphasis. Thus a material having 1% DTA exotherm is critically different from either an over-calcined material containing well-defined mullite or an under-calcined material having 30% DTA exotherm. Although there is some continuum of properties, such continuum should not remove attention from the surprisingly different properties exhibited by a material having about 7% DTA exotherm (as representative of the 3–15% range) nor the surprisingly different properties exhibited by a material having about 1% DTA exotherm (as representative of the 0.1 to 3% range) and the need for an arbitrary genus embracing both the 1% and 7% values, and the designation of the 0.1–15% range represents an effort to so define such genus. Inasmuch as some difficulties can be encountered in controlling the calcination of kaolin for the preparation of reactive kaolin, the engineering preferences generally are based upon assuming that raw kaolin is the starting material. Because pigment and paper-use markets exist for calcined kaolin having approximately 1% DTA exotherm, reasonably well controlled calcination conditions have been developed for this type of material. Although reactive kaolin having a DTA exotherm of 3–15% permits a wider range of aging conditions, the greater availability of the reactive kaolin having approximately 1% DTA exotherm makes it the preferred material for industrial production by a catalyst manufacturer seeking to avoid capital investment in kaolin calcination equipment. Mixtures of over-calcined kaolin and metakaolin, although producing predominantly amorphous mixtures having, upon DTA analysis, DTA exotherms less than 15% of that of raw kaolin, are unsuitable for faujasite production. Only the reactive kaolins resulting from the calcination controlled to provide a product having less than 15% DTA exotherm are suitable for the manufacture of faujasite by the present invention.

Heretofore massive blocks containing measurable amounts of synthetic crystalline zeolite have been described by laboratory scientists engaged in research on synthetic zeolites, and the nuisances of comminuting such blocks to prepare analytical samples have not prevented further scientific curiosity about such blocks. To engineers familiar with manufacturing costs, however, such blocks appear to be substantially insurmountable obstacles to low cost production of synthetic crystalline zeolitic materials. In manufacturing a cracking catalyst, the cost of comminuting a solid mass is so great that technologists generally thought to prepare either particles of the type desired for use in catalyst or a powdery precipitate of such particle size that it could be incorporated in a catalyst particle. Surprisingly, however, the massive blocks of product from the single stage of quiescent aging of the present invention are produced so reliably and cheaply as to justify the high cost of comminuting. Even though the capital cost and operating cost of the comminuting stages represent a sizable portion of total manufacturing costs, the comminuting route is surprisingly the cheapest route toward a cracking catalyst superior to competitive cracking catalysts comprising faujasite.

Single-step aging to produce synthetic chabazite and other zeolites has been described, but previously published descriptions of synthesis of sodium faujasite having a silica to alumina unit mol ratio above about 3.5 and high enough that a cracking catalyst derived therefrom can have competitively acceptable stability have heretofore required a multi-step aging procedure. However, baffling unreliability of some sodium faujasite synthesis procedures, leading, for example, to 40% faujasite during one run and 10% faujasite in an attempted duplication of the run, continued to plague sodium faujasite technologists. Surprisingly, the single-stage quiescent aging of the present invention provides the reliability and reproducibility permitting engineers to design and operate large production plants, a forward step not commercially feasible by the uncertain procedures requiring experienced specialists to reject a significant portion of their supposedly duplicate runs in laboratory equipment. In transforming failure into success by unobvious modifications of previous procedures, the present invention represents a significant forward step in cracking catalyst production.

The nature of the invention can be further clarified by reference to a plurality of examples.

EXAMPLE I

A catalytic grade of kaolin (highly crystalline and satisfactory low iron content) was calcined at about 1010° C. to produce a reactive kaolin exhibiting no well-defined mullite crystallinity and exhibiting a DTA exotherm about 0.4% that of the DTA exotherm of raw kaolin. A mixture was prepared from 5 parts by weight of said reactive kaolin and 6 parts of an aqueous solution of sodium hydroxide to provide clay to water to caustic weight ratios of 5:5:1. The aqueous solution was prepared from 5 parts of water and 1 part of sodium hydroxide (97% NaOH), corresponding to a weight concentration of 16.25% sodium hydroxide in the aqueous solution. This solution had a specific gravity at 20° C. in relation to 4° C. water of 1.1779. The molarity of the sodium hydroxide was 4.78, and the unit mol ratio of water to sodium oxide was 22.89 to 1.

The mixture of 5 parts of the reactive kaolin, 5 parts of water and 1 part of sodium hydroxide had a batter-like consistency. A covered beaker of the batter was placed in an oven at 95° C. for hot aging. The circulating air in the oven constituted a heat transfer fluid. Such air in the oven was maintained at a reasonably uniform temperature of 95° C. during the entire aging operation. The temperature of the composition was raised toward and maintained near the tempearture of such heat transfer fluid.

An X-ray analysis of a sample of the product after 24 hours of hot aging showed that no sodium faujasite had formed. After 72 hours of hot aging, the sample was removed from the oven. The batter-like mixture had been transformed to a solid mass which was removed from the beaker. The product composition was comminuted. It was found by X-ray measurements that the comminuted powder contained 17% sodium faujasite having a unit mol ratio of silica to alumina of 4.3 in the faujasite component. Such result was deemed a forward step beyond any procedure requiring the transfer of the composition to the oven after a step of regulated duration of aging in a zone having the heat transfer fluid at a lower temperature.

During the aging operation, the initially viscous composition, resembling pancake batter, had undergone a chemical transformation, not attributable to evaporation of water, resulting in the formation of a hard cake. Because of the cost of grinding such a cake to a uniform particle size suitable for use in subsequent steps of manufacture, engineers have been reluctant to rely upon any method for synthesizing a sodium zeolite involving such cake formation, notwithstanding the frequent reference to such cake formation in attempts to prepare sodium zeolites by hot aging of quiescent compositions. Accordingly, previous preferences for manufacturing sodium zeolite compositions were for continuous methods which did not require the grinding of cakes produced batchwise. Surprisingly, however, the advantages of reliability of production by quiescent aging of batches has been more significant than the disadvantage of grinding the resulting cakes.

EXAMPLE II

A procedure was followed substantially the same as that of Example I, except that the beaker was removed from the oven at the end of 96 hours and it was established that the sodium faujasite content of the sodium aluminosilicate cake was 45%, and that the unit mol ratio of silica to alumina in the faujasite component was 4.90. Such combination of high silica to alumina ratio and 45% faujasite content offers advantages to technologists concerned with the manufacture of cracking catalyst. Moreover, the selectivity ratio was high, so that the total zeolite (measured as base exchange capacity per gram) was not significantly greater than calculated from the faujasite content (measured by X-ray diffraction).

EXAMPLES III–V

In Examples III, IV and V, the amount of reactive kaolin dispersed in the 16.25% sodium hydroxide solution provided weight ratios of 4.5:5:1 instead of the 5:5:1 ratios of reactive clay to water to caustic of Examples I and II. The procedure of Example I was followed except as to duration of oven treatment. Partly by reason of the fact that the batter-like composition had a smaller proportion of clay, the formation of faujasite advanced more rapidly. In Example III, the beaker was removed from the oven at 36 hours, and the sodium aluminosilicate cake was found to contain 32% sodium faujasite having a unit mol ratio of silica to alumina in the faujasite component of 4.3. In Example IV, the beaker was removed after 72 hours, and the sodium aluminosilicate cake was found to contain 69% sodium faujasite. In Example V, the beaker was removed from the 96° C. oven after 96 hours, and the sodium aluminosilicate cake was found to contain 72% faujasite. In each case, the ratio of faujasite to total zeolite was close enough to unity to merit the classification of the method as significantly more selective for faujasite than many methods of preparing faujasite.

In each of the previous examples, the air circulating in the oven maintained at the uniform temperature of about 96° C. constituted a heat transfer fluid. The temperature measurements were made of the circulating air, recognizing that the temperature of the composition would approach such temperature, except for whatever thermal barrier might be provided by the gas film, thickness of the beaker, and/or other similar thermal barriers.

EXAMPLE VI

In a pilot plant operation, a 35 gallon steel drum was lined with a removable polyethylene bag. A mixture was prepared from reactive kaolin and 16.25% sodium hydroxide solution, providing a weight ratio of 4.5:5:1 for reactive kaolin/water/sodium hydroxide. The agitated batter was poured into the polyethylene bag in the drum. The drum was transferred to a preheated oven maintained at about 96° C. Air was employed as the heat transfer fluid for circulation throughout the oven at about 96° C., thereby heating the drum and contents toward the hot aging range. The drum was covered so that there was no gas exchange, no evaporation and no related interaction between the heat transfer fluid and the contents of the drum. The total aging operation had a sufficient degree of reproducibility to permit control of each batch under the general supervision of factory technicians. Successive batches maintained in the oven for the same period provided about the same amount of faujasite having about the same silica to alumina ratios in the faujasitic component. The optimum concentration of sodium faujasite in a precursor for use in a petroleum cracking system of a type which has been much used is about 35%, but other end uses might favor other faujasite concentrations. By keeping the drums in the 96° C. oven for about 30 hours a product containing about 35% sodium faujasite was otbained. Certain delays occurred in the transfer of heat from the hot air of the oven to the center core of the mixture in the drum. Average temperatures of the mass differed from spot temperatures of portions of the mass until the core was heated to substantially the same temperature as the temperature of the mass adjacent to the polyethylene bag. During most of the 30 hours in the oven, the average temperature of the mass was in the hot aging range above 80° C.

To the factory technicians, the time required for heating the core (or even the periphery) of the mixture in the drum did not rquire any measurement, and hence was not significant. From the standpoint of management of the factory, the process is best described as single stage quiescent aging. Of importance to the factory manager is the significant result of reliable reproducibility of results using such single stage quiescent aging, as contrasted with troublesome baffling irregularities encountered at times with other aging systems of sufficient merit to be evaluated in a pilot plant.

EXAMPLE VII

A catalytic grade of kaolin was calcined in the 965–1095° C. range to provide a reactive clay which, upon evaluation by Differential Thermal Analysis, exhibited an exotherm at about 980° C. which was 0.5% of the DTA exotherm of raw kaolin. This reactive kaolin was mixed with aqueous sodium hydroxide to provide a weight ratio of 4.5 clay:5 water:1 NaOH. Said proportions correspond to 1 mol of $Al_2O_3$, 2 mols of $SiO_2$, 0.6 mol of $Na_2O$, 0.6 mol of water in the NaOH component, and 13.7 mols of water as liquid, providing a total 14.3 mols of water. Thus, the composition corresponded to that which might be expressed as:

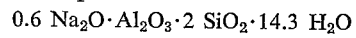
$$0.6\ Na_2O \cdot Al_2O_3 \cdot 2\ SiO_2 \cdot 14.3\ H_2O$$

A propeller mixer was used for dispersing the clay in the aqueous alkaline solution to provide a composition having a consistency comparable to pancake batter. This batter of $0.6\ Na_2O \cdot Al_2O_3 \cdot 2\ SiO_2 \cdot 14.3\ H_2O$ was poured into a 35 gallon drum and the drum was promptly placed in an oven in which air was circulated at about 96° C. The drum was removed from the oven after 34 hours. During the time that the drum was in the oven, the composition was transformed from a viscous batter to a cake having a composition corresponding essentially to the

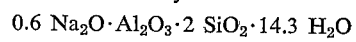
$$0.6\ Na_2O \cdot Al_2O_3 \cdot 2\ SiO_2 \cdot 14.3\ H_2O$$

There was no change in the moisture content during the hot aging, inasmuch as the drum was covered. The cake was discharged from the drum and subjected to grinding to provide a powder suitable for analysis. The presence of 41.5% sodium faujasite having a silica to alumina mol ratio of 5.09 in the faujasite component was shown by X-ray diffraction. The powder had a base exchange capacity of 1.7 milli-equivalents per gram of anhydrous solid, indicating high selectivity for the faujasite in the synthesis, and the substantial absence of by-product zeolites.

EXAMPLE VIII

A catalytic grade of kaolin was calcined at conditions sufficiently severe that the reactive kaolin exhibited a DTA exotherm of about 0.1% when evaluated by the standard DTA procedure. The kaolin was calcined in the 965–1095° C. range at conditions such that the product was substantially amorphous and free from well-defined crystallites of mullite. A batter was prepared using a high speed impeller for dispersing the reactive clay in the 16.67% sodium hydroxide solution. The proportions were 4.5 parts of reactive kaolin to 5 parts of water to one part of sodium hydroxide and the general procedure was that of Example VII. The drum was kept in the oven for 26 hours instead of 34 hours. The product contained about 27.7% sodium faujasite having a silica to alumina unit mol ratio of 4.97 in the faujasitic component. The base exchange capacity of the product was about 1.2 milli-equivalents per gram, indicating the substantial absence of zeolites other than faujasite, and indicating high selectivity for the synthesis.

EXAMPLE IX

Kaolin was calcined to provide a reactive kaolin exhibiting, upon Differential Thermal Analysis, an exotherm at about 980° C. which was about 7.4% of the DTA exotherm of raw kaolin. This calcined kaolin was mixed with 16.67% sodium hydroxide solution to provide weight ratios of clay to water to caustic of 4.5:5:1. The mixing was conducted at room temperature. The slurry was stirred vigorously while being intensely heated very rapidly, so that the composition was raised from room temperature to 96° C. during a period of 15 minutes. After the desired aging temperature of 96° C. had been attained, the mixing was discontinued, and the composition was aged quiescently for 36 hours at 96° C. The container in which the composition was aged was covered so that there was no transfer of moisture between the composition and the circulating hot air in the oven during hot aging. The composition became a solid mass and the amorphous aluminosilicate crystallized to form faujasite; however, the elemental analysis of the total contents of the container remained unchanged, being the same as for the initial mixture, i.e. 4.5 clay:5 $H_2O$:1 NaOH, or 0.614 $Na_2O \cdot Al_2O_3 \cdot 2 SiO_2 \cdot 14.3 H_2O$.

Said solid mass was subjected to crushing and other stages of comminuting. A sample was analyzed by X-ray diffraction and found to contain 76% sodium faujasite. The base exchange capacity of the composition was 3.9 milli-equivalents per gram. Inasmuch as the amount of base exchange capacity attributable to the faujasite would have provided such 3.9 milli-equivalents per gram, the data indicated that the faujasite synthesis had been highly selective with not more than trace amounts of zeolites other than the desired faujasite being formed.

EXAMPLE X

The conditions of calcination employed were sufficiently severe to bring about the formation of a calcined kaolin exhibiting a DTA exotherm which was about 3.4% that of raw kaolin. The procedure of the previous example was followed. An analysis of the product showed the presence of 73% faujasite and a base exchange capacity of 3.8 milli-equivalents per gram, thus indicating that the process was highly selective for faujasite formation.

EXAMPLE XI

A calcined kaolin exhibiting a DTA exotherm of about 7% of that of raw kaolin was mixed with aqueous alkali to prepare a composition having about 4.5 parts of clay, 5 parts of water, and 1 part by weight of sodium hydroxide. This composition was covered, and stored under conditions such that there was no transfer of moisture between the composition and the atmosphere, and the product was aged at ambient temperature for 10 days. A cake formed, and the solid mass was comminuted, dried, and processed for analysis. The material was found to contain 8% sodium faujasite.

EXAMPLE XII

Several preparations of sodium faujasite were conducted in obtaining evidence that there was reasonable reproducibility of the quiescently aged compositions prepared from clay and 16.67% sodium hydroxide solution.

Clay calcined to exhibit a DTA exotherm of about 3.4% that of raw kaolin was mixed with 16.67% sodium hydroxide solution and transfered to a covered vessel. The mixture was placed in an oven in which air was circulated at about 100° C., it being expected that the solid mass would equilibrate at a slightly lower temperature such as about 96° C. as a result of the insulating action of the walls of the container and related barriers to heat transfer. Analyses were made after periods of 20, 28, and 36 hours and an effort was made to determine the conditions affecting selectivity by measuring the closeness of the graph lines indicating the increase in zeolite production and the increase in faujasite production. Total zeolite production was measured by base exchange capacity and faujasite content was measured by X-ray diffraction.

Several preparations employed weight proportions of 3.33:5:1 for the ratios of calcined kaolin to water to sodium hydroxide and are identified by a sample code beginning with 1. Several preparations employed weight proportions of 3.81:5:1, and are identified by a sample code beginning with 2. In both instances the designations B and C are repeats of A. The designations $a$, $b$ and $c$ represent the time intervals of 20, 28 and 36, respectively, in hours. The unit $SiO_2/Al_2O_3$ mol ratio for the faujasite component of products from proportions "1" was 3.8, and thus measurably inferior to the 4.2 $SiO_2/Al_2O_4$ unit mol ratio of the "2" samples. Data relating to 18 preparations are set forth in the following table.

| Sample | Hours at 96° C. | Percent Faujasite | BEC, m.eq./gm. |
|---|---|---|---|
| 2 Aa | 20 | 29.7 | |
| 2 Ab | 28 | 44.3 | |
| 1 Ac | 36 | 41.7 | |
| 1 Ba | 20 | 29.0 | 2.09 |
| 1 Bb | 28 | 56.7 | 3.21 |
| 1 Bc | 36 | 63.7 | 3.35 |
| 1 Ca | 20 | 23.0 | 1.74 |
| 1 Cb | 28 | 38.0 | 2.40 |
| 1 Cc | 36 | 49.7 | 3.24 |
| 1 Aa | 20 | 8.3 | |
| 2 Ab | 28 | 25.3 | |
| 2 Ac | 36 | 40.7 | |
| 2 Ba | 20 | 5.0 | 1.26 |
| 2 Bb | 28 | 20.0 | 1.52 |
| 2 Bc | 36 | 41.7 | 2.52 |
| 2 Ca | 20 | 14.3 | 1.32 |
| 1 Cb | 28 | 22.3 | 1.55 |
| 2 Cc | 36 | 44.0 | 2.28 |

By series of such tests, it was established that an advantageous combination of selectivity and reproducibility, and properties of the product, was achieved using the 4.5:5:1 proportions instead of these more diluted mixtures.

EXAMPLE XIII

Kaolin was calcined to provide a reactive kaolin exhibiting, upon Differential Thermal Analysis, an exotherm at about 980° C. which was about 7% of the DTA exotherm of raw kaolin. This calcined kaolin was heated to 95° C. and then mixed with an aqueous solution preheated at 95° C., said solution containing 16.67% sodium hydroxide. Thus, the mixing of the composition having weight ratios of clay to water to caustic of 4.5:5:1 was conducted at 95° C. The thus hot-mixed composition was transferred to an oven and maintained at about 95° C. for 36 hours. The sodium faujasite content of the product was about 35%.

The criticality of the DTA exotherm property was demonstrated when an attempt was made to prepare sodium faujasite starting with a clay calcined to provide a reactive kaoline exhibiting, upon Differential Thermal Analysis, an exotherm at about 980° C. which was about 0.5% of the DTA exotherm of raw kaolin. After such calcined kaolin had been preheated to 95° C., it was mixed with preheated (95° C.) sodium hydroxide solution to provide a mixture having an initial temperature of 95° C. Hot aging of this composition at 95° C. for 36 hours led to a product containing less than an acceptable amount of sodium faujasite. As explained in Examples I–VII, a reactive kaolin exhibiting a DTA exotherm of the magnitude of 0.5% is suitable for manufacturing a faujasitic type of zeolite by an appropriate control of the temperature pattern during the single stage of quiescent aging. Conducting the mixing of ingredients at ambient temperature has many advantages over mixing of preheated ingredients. In establishing outer limits for operability of the temperature patterns, the evidence suggests the versatility of the more difficulty prepared reactive kaolin exhibiting a DTA exotherm of 3–15%. However, the greater availability of the reactive kaolin exhibiting a DTA exotherm of 0.1–0.3% or 0.3–3% tends to make one of the less versatile reactive kaolins a preferred component for the preparation of the batter subjected to quiescent aging.

Various modifications of the invention are possible, and the previous description should be deemed illustrative, inasmuch as the scope of the invention is set forth in the appended claims.

The invention claimed is:

1. In a method of preparing compositions comprising sodium faujasite by the treatment of a mixture of water, an alkaline substance comprising sodium hydroxide, and calcined kaolin, the improvement which includes the steps of: calcining kaolin at a temperature in the range from 965° C. to 1095° C. at conditions providing a reactive calcined kaolin exhibiting upon Differential Thermal Analysis, an exotherm at about 980° C. which is greater than 3% but less than 15% of the exotherm of raw kaolin, said reactive kaolin being amorphous and free from well-defined crystallites of mullite; preparing a composition in which the reactive ingredients consist essentially of from 2.1 to 5 parts of said reactive kaolin, 3.5 to 6 parts of water, and 1 part of sodium hydroxide; and aging quiescently the thus prepared composition for a period of about 10 days at about ambient temperature to produce a product comprising sodium faujasite.

2. In a method of preparing compositions comprising sodium faujasite by the treatment of a mixture of water, an alkaline substance comprising sodium hydroxide, and calcined kaolin, the improvement which includes the steps of: calcining kaolin at a temperature in the range from 965° C. to 1095° C. at conditions providing a reactive calcined kaolin exhibiting upon Differential Thermal Analysis, an exotherm at about 980° C. which is greater than 3% but less than 15% of the exotherm of raw kaolin, said reactive kaolin being amorphous and free from well-defined crystallites of mullite; preparing a composition in which the reactive ingredients consist essentially of from 2.1 to 5 parts of said reactive kaolin, 3.5 to 6 parts of water, and 1 part of sodium hydroxide, said composition being prepared by preheating aqueous solution of sodium hydroxide to about 90° C. and mixing with reactive kaolin preheated to about 90° C.; and aging quiescently the thus prepared composition for a period of from about 10 hours to about 10 days at an elevated temperature to produce a product comprising sodium faujasite.

References Cited

UNITED STATES PATENTS

| 3,119,660 | 1/1964 | Howell et al. | 23—112 |
| 3,338,672 | 8/1967 | Haden et al. | 23—112 |
| 3,367,886 | 2/1968 | Haden et al. | 252—455 |
| 3,367,887 | 2/1968 | Haden et al. | 252—455 |
| 3,391,994 | 7/1968 | Haden et al. | 23—112 |

EDWARD J. MEROS, Primary Examiner

U.S. Cl. X.R.

252—455

PO-1050
(5/69)

UNITED STATES PATENT OFFICE
CERTIFICATE OF CORRECTION

Patent No. 3,515,511      Dated June 2, 1970

Inventor(s) William H. Flank

It is certified that error appears in the above-identified patent and that said Letters Patent are hereby corrected as shown below:

Column 1, line 45 - "aluminus" should read --aluminum--.

Column 2, line 34 - "sime" should read --some--.

Column 2, line 70 - "in" should read --is--.

Column 4, line 22 - "satisfactory" should read --satisfactorily--.

Column 7, line 65 - "transfered" should read --transferred--.

Column 8, line 14 in formula - "$Al_2O_4$" should read --$Al_2O_3$--.

Column 8, in the table:
    line 17 - "2" should read --1--.
    line 18 - "2" should read --1--.
    line 23 - "1" should read --2--.
    line 28 - "1" should read --2--.

Column 8, line 42 - "at" should read --to--.

Column 8, line 52 - "kaoline" should read --kaolin--.

Column 8 - line 69 - "difficulty" should read --difficultly--.

SIGNED AND
SEALED
SEP 22 1970

(SEAL)
Attest:

Edward M. Fletcher, Jr.
Attesting Officer

WILLIAM E. SCHUYLER, JR.
Commissioner of Patents